Figure 1:
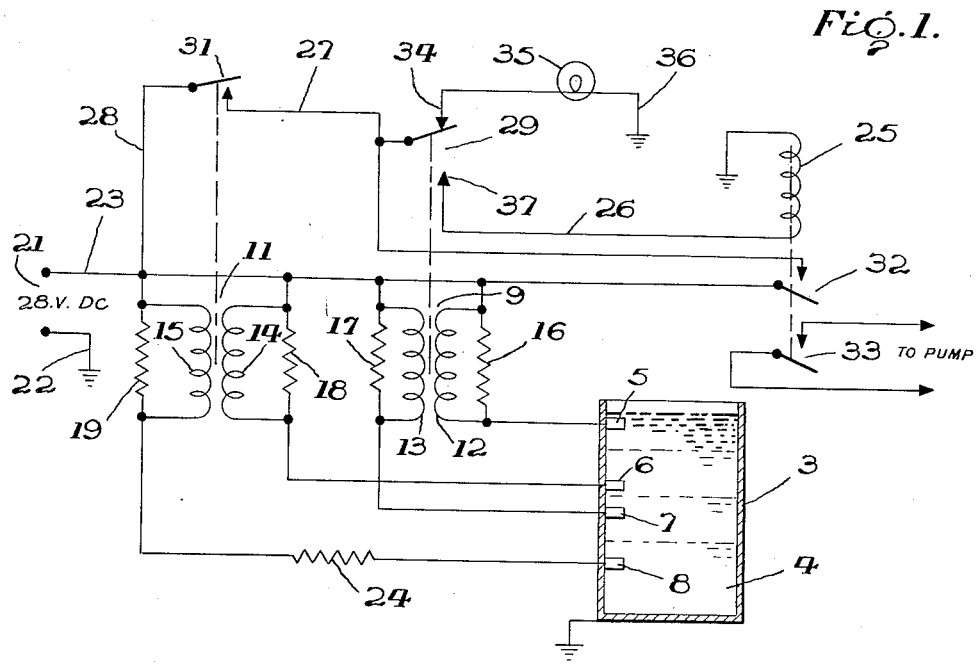

Oct. 9, 1956

J. SCHWARZKOPF 2,766,406

LIQUID LEVEL CONTROL SYSTEM

Filed March 5, 1953

INVENTOR
*Jerome Schwarzkopf.*

BY *Robert F. Peck*

ATTORNEY

United States Patent Office 2,766,406
Patented Oct. 9, 1956

2,766,406

LIQUID LEVEL CONTROL SYSTEM

Jerome Schwarzkopf, Baltimore, Md., assignor to Bendix Aviation Corporation, Baltimore, Md., a corporation of Delaware Application March 5, 1953, Serial No. 340,594

3 Claims. (Cl. 317—132)

This invention relates generally to apparatus for controlling liquid level and in particular to a control system embodying a plurality of temperature responsive resistor units connected and arranged so as to control the level of a confined body of liquid between at least two predetermined levels.

The temperature responsive resistors utilized in the subject invention are of the type known as thermistors, commonly available in the form of sintered metallic oxides having a negative temperature coefficient of resistance. Such sintered oxides may be in the form of thin rods or other convenient shapes, and in the case of a rod type thermistor, accurate control of liquid level can be maintained within a tolerance equivalent to the nominal diameter of such rods. When using a rod type thermistor in the liquid level control circuit, it is necessary to provide some means for mounting the thermistor in heat transfer relationship with the body of liquid, and an example of such a unit is shown and described in the co-pending patent application of Franklin O. Wisman, Serial Number 215,261 filed March 13, 1951, now abandoned in favor of continuation application Serial No. 450,578, filed August 18, 1954, and it is to be understood, in connection with the descriptive matter following, that the particular cartridge arrangement shown in the aforesaid Wisman application is of the type utilized by applicant in his novel control system.

There are many applications wherein it is desirable to control the level of a liquid between two predetermined levels, one such application being control of the level of liquid in an aircraft reservoir tank. In such tanks there is sometimes a continuous flow therefrom, and it is highly desirable to have some means to respond to the flow such that replenishment of the quantity of liquid in the tank is automatically initiated when the use factor is such that the level of the liquid in the tank falls to a predetermined critical level beyond which it is undesirable to continue usage from the tank without a concurrent replenishment. Normally, such tanks function between the full and half-full levels and must have automatic control means to initiate pumping action when the level of the liquid in the tank reaches the half-full mark. In a properly designed system, when the critical level is reached, the pumping action will commence and continue until the level of the tank is restored to its normal full level, at which time the pump is automatically stopped and the control circuit thereafter remains in a standby condition ready for the next cycle of events. Furthermore, in the event of a failure of the pump system for any reason whatsoever, or in the event that the pump is not able to keep up with the flow from the tank, both of which could contribute to a condition wherein the level of the tank falls substantially below the half-full level, then under such conditions it is desirable that an alarm device be automatically actuated to give a warning of such condition. In some applications it is desirable to shut off the pump during the abnormal period of operation, and in other applications it is desirable to continue the pumping whenever the alarm condition exists.

In addition to the requirements set forth above for such a system, the component parts of the system which come in contact with the liquid must be of such a nature that there is no fire hazard, and furthermore, the system must be designed so that in most instances of component failure, the system will "fail-safe," in that the pump will operate to fill the tank whenever there is an open circuit of any of the component parts of the system. Combined with all of the features set forth above, there must be simplicity, ruggedness, reliability and minimum weight and volume for all normal applications.

It is therefore an object of the present invention to provide a liquid level controlling device embodying all of the features heretofore discussed and in fulfillment of this objective the subject invention provides for use of a plurality of thermistors adapted to be connected and arranged in such a way that a new and novel liquid level control system is derived therefrom.

Before discussing the over-all system, it is in order to consider briefly the theoretical aspects of the functioning of the thermistor when used as a liquid level sensing element. Thus, as is well known to those skilled in the art of semi-conducting bodies, thermistors possess the unique characteristic of undergoing a substantial decrease in resistance upon an accompanying increase in temperature. Whether or not the temperature increase results from ambient conditions surrounding the thermistor or whether such temperature rise is self-induced, the operation is the same, and in the case of liquid level sensing elements the self-induced or self-heating characteristic of the thermistor is relied upon to sense liquid level. If the circuit embodying the thermistor is so arranged that a current flows, having a magnitude of sufficient order to maintain the thermistor in a self-heated condition, its resistance will be fixed at a normally low value. When such a thermistor is immersed in a liquid, such as oil, the heat transfer characteristic of the oil will enable the thermistor to cool rapidly despite its self-generated heat, and thus remain relatively cool and thereby reach a relatively high value of resistance. Proper circuit adjustments can maintain this operation quite stable for any period of time that the thermistor is immersed in the liquid. Now if for any reason the liquid level falls to thereby expose the thermistor to air, the substantial decrease in the heat transfer capabilities of air, as compared to that of liquid, will impede the ability of the thermistor to dissipate its self-generated heat and the temperature of the thermistor will rapidly rise, thereby rapidly decreasing its resistance. Such action takes place in a few seconds and the change in resistance is quite substantial and is of a sufficient magnitude to permit the use of simple electrical circuits responding to such change in resistance. Carrying this discussion further, should the liquid level, after having once exposed a thermistor to air, rise and re-immerse the thermistor, the self-generated heat will be rapidly dissipated away by the increased heat transfer capabilities of the liquid and the thermistor will rapidly cool and its resistance will rise to its normal relatively high stable value.

In the subject invention, one thermistor is adapted to be positioned at a first level corresponding to the full level of the body of liquid to be controlled. A second thermistor is adapted to be positioned at the critical or half-full level, and the fluctuation of the liquid level about these two thermistors is immediately detected by the thermistors and through their associated circuitry necessary control is achieved. A third and fourth thermistors are utilized in applicant's system to provide temperature compensating means and at the same time provide for the operation of an alarm circuit under any abnormal conditions encountered during the cycle of operation.

In the embodiment chosen for purposes of illustration, the thermistors utilized by applicant are connected to suitable electrical control means in the form of differential relays. A pump control means in the form of a relay is also shown, and under normal conditions of operation the various contacts or switches controlled by the relays remain open to thereby render the control circuit open under all normal conditions. The first thermistor is adapted for mounting at the full level of a body of liquid and is arranged in opposition to a third thermistor adapted to be mounted below the half-full level of the confined liquid. With these two thermistors mounted in opposition through the windings of their associated differential relay, and when both thermistors are covered by the liquid, their electrical characteristics are identical, and their associated relay remains inoperative. However, when the level of the liquid falls to uncover the first thermistor, an unbalanced electrical condition occurs in their associated relay thereby initiating actuation of same and, in the embodiment shown, the normally open switch is closed. This switch is part of the control circuit and remains closed in a standby condition in the event that the liquid level continues to fall.

The second and fourth thermistors are connected in opposition with an associated differential relay, and with the two thermistors covered by liquid their electrical characteristics are equal and their associated differential relay remains inoperative. Normally, the second thermistor is adapted to be mounted at the half-full level in the tank, whereas the fourth thermistor may be conveniently located near the bottom of the tank. When the liquid level falls to uncover the second thermistor, an unbalanced condition occurs across the differential relay to thereby actuate same and close a normally open switch controlled thereby. This second switch, when closed, actuates the control circuit, which in turn starts the pump operating to restore the level of the liquid to its normal full level point. Once the pump begins operation a new control circuit is established which eliminates the second switch, so that upon a rise in liquid level above the second thermistor and a consequent opening of the second switch, the pump will not be affected but will continue to run until the level of the liquid is restored to its full level point.

If for any reason the pump does not operate to raise the level of the liquid below its critical half-full point, and the liquid level continues to drop, the third thermistor would be uncovered by the drop in liquid level, thus re-establishing a balanced electrical condition in its associated differential relay. This change in the relay will operate to close the alarm circuit which may have any suitable electrically operable visible or audible means embodied therein as an alarm device.

Figure 2:
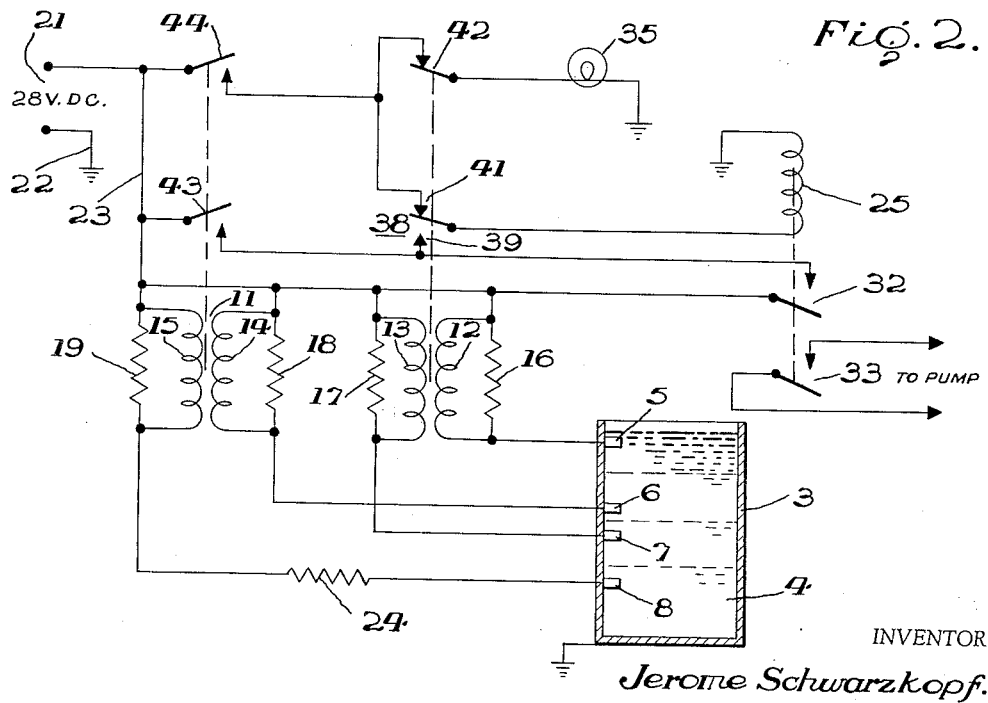

The invention, together with its attendant benefits and advantages, will be best understood upon reference to the detailed specification to follow below, when taken in conjunction with the annexed sheet of drawings, in which Figure 1 is a schematic showing of one embodiment of the subject invention, and Figure 2 is similar in all respects to the schematic showing in Figure 1, with additional means to permit uninterrupted operation of the pump at all times when the liquid level continues to fall below the critical half-full level.

Referring first to Figure 1, there is shown a tank 3 having a body of liquid 4 confined therein and a plurality of thermistors 5, 6, 7, 8 positioned one below the other in the tank, the thermistor 5 being positioned at a level in the tank corresponding to the normal full level of the liquid therein, the thermistor 6 being positioned at a level corresponding to the half-full level of the confined liquid, the thermistor 7 being positioned below the half-full level of the liquid, and the thermistor 8 being positioned near the bottom of the tank. All of these thermistors are provided with suitable mounting means and may be of the type shown in the aforesaid co-pending Wisman application. Suffice to say that one terminal of the thermistor is grounded and one terminal is connected to its corresponding external electrical circuit. In the embodiment shown, thermistors 5 and 7 have identical characteristics, and thermistors 6 and 8 also have identical characteristics. Furthermore, the arrangement of the thermistors provides for effective temperature compensation, because any variations in ambient temperature will affect the two pairs of thermistors in a like manner, and thus cancel out without any effect on the associated control circuits.

A pair of control means in the form of differential relays 9, 11 are provided, having opposed relay windings 12, 13 and 14, 15, respectively. Connected across each of these relay windings are the shunt resistors 16, 17 and 18, 19, respectively, and a suitable power source 21 is provided (which in the illustrated embodiment may be a 28 volt source of direct current), one side of which is grounded at 22, the other side of which is connected to power lead 23. Each of the differential relay windings and its associated shunting resistor is connected in series with a liquid level sensing thermistor, the winding 12 beng connected to thermistor 5, the winding 13 being connected to thermistor 7, the winding 14 being connected to thermistor 6, and the winding 15 being connected to thermistor 8 through an additional ballast resistor 24. All of the aforementioned thermistor circuits require a rather substantial flow of current to operate in the self-heating range, and the shunting resistors 16, 17, 18, 19 are provided to carry some of this current, in view of the fact that the particular differential relay windings shown would not be able to carry such current flow. If the windings could carry the current flow, then the shunting resistors could be dispensed with.

A pump control circuit is connected to power source 21 and comprises a relay winding 25, one end of which is grounded and the other end of which is connected to power lead 23 through leads 26, 27, 28 and the normally open switches 29, 31. Switch 29 may be of the single pole double-throw type and is controlled by relay 9, and switch 31 may be of the single pole single-throw type and is controlled by relay 11, and when both of these switches are closed, the pump relay 25 is energized to thereby close the normally open switches 32, 33. Switch 32 comprises a set of bridging contacts connected across the switch 31 to furnish an alternate path for energization of the pump relay winding 25, once the winding 25 has been energized, and the switch 31 opens upon a rise in liquid level. The switch 33 is connected to a suitable pump control circuit and upon closure thereof it is assumed that the pump is energized to automatically pump additional liquid into the tank 3 to thereby raise its level to the normal full level point. The details of the pump, pump circuits, piping, etc. form no part of the subject invention, and for the sake of brevity and clarity have not been shown on the drawings and will not be described in any detail beyond that set forth above.

The switch 29 has a back contact 34 connected to an alarm device 35, one side of which is grounded at 36. In the particular arrangement shown, alarm device 35 is in the form of a lamp, although any suitable alarm device could be substituted for the lamp shown, depending upon the particular application for which the liquid level control system is intended.

With the above arrangement of parts in mind, the operation of the system will be quite apparent. In the normal condition, where the liquid level covers thermistor 5, all switches will be in the position shown in Figure 1. Under this condition the current flowing in the windings of the differential relays 9, 11 are equal and opposite and the relays are thus inoperative. It is to be noted that in connection with differential relay 11 the ballast resistor 24 has no significant effect on the current flow when the thermistors 6, 8 are both covered by liquid. This condition exists because when the thermistors 6, 8 are covered their normal value of resistance is high and with proper selection of the value of resistance 24, the normal high value for the thermistors will fully mask out any influence on the circuit that could possibly be caused by ballast resistor 24, so that for all practical purposes, currents flowing in the two relay windings are identical. A different situation will exist when the thermistor 8 is uncovered by the liquid, for in this case the value of resistance will tumble to a value approaching the magnitude of resistance of the ballast resistor 24, so that under such conditions the ballast resistor will operate as a current limiter to prevent equal magnitude current flow when both thermistors 6, 8 are uncovered, thereby preventing the switch 31 from opening under such conditions.

When the liquid level falls to uncover thermistor 5, the current in the windings of the relay 9 will become unbalanced and this unbalance will actuate the relay 9 to close the switch 29 on its front contact 37. As the liquid level continues to fall it will uncover thermistor 6. In such an event unbalanced current flow occurs in the windings of the differential relay 11, thereby causing the switch 31 to be closed. With the closure of switches 31, 29, a circuit is established to the pump relay winding 25 and energization of same will cause closure of switches 32, 33. Closure of switch 33 will initiate pumping action. If the system is functioning normally, the pump will supply liquid to the tank and cause the level to rise. As the level rises the thermistor 6 will be covered, restoring again a balanced condition in the windings of differential relay 11 to thereby permit opening of switch 31. The pump circuit is not disturbed upon this happening, however, as the switch 32 is connected across 31 and remains closed until the winding 25 is deenergized. Continued pumping will bring the liquid level to its normal full level point, at which time thermistor 5 is again covered by liquid, thus permitting a balanced current to again flow in the windings of differential relay 9. Upon such a happening, switch 29 will open from its front contact 37 to thereby deenergize pump relay 25, opening switches 32, 33 and thereby shutting down the pump.

The above cycle is a normal intended cycle of operation, but in the event that the pump does not operate to restore the liquid level and the level continues to fall below the half way point until thermistor 7 is uncovered, then both thermistors 5, 7 will be uncovered by liquid and a balanced condition will again occur in the windings of differential relay 9. Upon the happening of this event the switch 29 will open from its front contact 37 and close upon its back contact 34, the switch 31 being already in the closed position, and closure of contact 34 will energize the alarm device 35 and at the same time opening of switch 29 from its front contact 37 will serve to shut down the pump. A continued fall in liquid level will not affect the operation of the alarm device 35 despite the fact that thermistor 8 is uncovered, because under such conditions the ballast resistor 24 will retain an unbalanced current flow in the windings of differential relay 11 to thereby keep its associated switch 31 in the closed position. Thus the alarm device 35 will remain energized indefinitely until such time as the abnormalities of the system are corrected and the liquid level is restored to at least the half-full level in the tank.

In the event it is desired to continue the operation of the pump after the alarm has been given that the liquid level is below the predetermined critical level, the circuit shown in Figure 2 has been devised to provide such operation. For the sake of clarity, identical parts have been given identical reference characters in Figure 2, and it is to be noted that Figure 2 is similar in all respects to Figure 1 save for the additional switches added to the differential relays 9, 11. Considering first differential relay 9, there is shown switch 38 having front and back contacts 39, 41, respectively, and a single pole single-throw switch 42. Differential relay 11 is provided with a pair of single pole single-throw switches 43, 44.

Considering the operation in this alternative arrangement, when the liquid level falls to uncover thermistors 5, 6, the contact 39 and switches 43, 44 will be closed to establish a closed circuit for the pump relay winding 25. The switch 32 is connected across switch 43 in a manner similar to the arrangement shown in Figure 1, so that the relay winding 25 will remain energized upon a rise in liquid level until the normal full level is reached. In the event that the liquid level falls instead of rising after the half-level point is reached to thereby uncover thermistor 7, the switch 38 will close on back contact 41 and switch 42 will close at the same time. This sequence of switching serves to establish an alternate path for energization of relay winding 25 through back contact 41 and switch 44. The alarm device will be energized through switch 42 and switch 44, thus for continued fall in liquid level the alarm device will remain energized, as will the pump. In the event that the liquid level drops to a level where it uncovers thermistor 8, the ballast resistor 24 will prevent opening of switches 43, 44 so that the alarm device 35 and the pump will continue to be energized indefinitely until the system is restored to its normal operating condition.

What is claimed and desired to be secured by United States Letters Patent is:

1. In apparatus for regulating the level of liquid in a container, a main electric circuit connected to a source of supply and having associated therewith a relay circuit provided with a relay for controlling a pump or like liquid-replenishing means, first and second normally open switches arranged in series in said main circuit and which when closed complete the circuit to said control relay to energize the latter and place the liquid-replenishing means in operation, an electric signal circuit having therein a signal device for indicating when the liquid drops below a predetermined level in the container, said signal circuit being energized through opening movement of said first switch, first and second differential relays each having a pair of opposed relay windings for controlling said first and second switches, a first thermistor located at an upper full level in said container and electrically connected to one of the windings of said first differential relay, a second thermistor located at an intermediate level above said predetermined level and electrically connected to one of the windings of the said second differential relay, a third thermistor located in said container at said predetermined level and electrically connected to the other winding of said first differential relay, means for maintaining the flow of current through the other winding of said second differential relay at a rate such as to maintain the second differential relay in balance as long as said second thermistor is covered by liquid, said first and second thermistors when uncovered successively by a drop in the level of the liquid during normal operation of the apparatus unbalancing the said differential relays in successive order to in turn close said serially-arranged switches in like order and energize said control relay to replenish the liquid back to the full level whereupon the differential relays are again balanced permitting said series switches to open and deenergize said control relay, should the liquid supply fail, however, and the level of the liquid continue to drop below said third thermistor, a balanced condition will occur in said first differential relay while an unbalanced condition exists in said second differential relay permitting said first switch to open and energize said signal circuit with said second switch closed, and a normally open switch actuated by said control relay and connected in shunt with said first switch for controlling the operation of said liquid-replenishing means during the time the signal circuit remains energized.

2. Apparatus as claimed in claim 1 wherein said means for maintaining the flow of current through the other winding of the second differential relay at a rate such as to maintain the said second differential relay in balance as long as the second thermistor is covered by liquid includes a fourth thermistor located in said container below said third thermistor and electrically connected to said other winding.

3. Apparatus as claimed in claim 2 wherein said fourth thermistor is connected to its associated differential relay winding through a current-limiting resistor having an ohmic value such that it functions as a current limiter only when said fourth thermistor is not covered by liquid, such limiting current being different in magnitude from the current flowing in said second thermistor circuit.

References Cited in the file of this patent

UNITED STATES PATENTS

| | | |
|---|---|---|
| 2,078,479 | Briggs | Apr. 27, 1937 |
| 2,139,504 | King | Dec. 6, 1938 |
| 2,211,606 | Pratt | Aug. 13, 1940 |
| 2,385,161 | Pinkerton | Sept. 18, 1945 |
| 2,641,992 | Clemens | June 16, 1953 |

FOREIGN PATENTS

| | | |
|---|---|---|
| 678,618 | Germany | July 19, 1939 |